United States Patent
Bechhoefer

(10) Patent No.: US 7,512,463 B1
(45) Date of Patent: Mar. 31, 2009

(54) REDUCING VIBRATION USING QR DECOMPOSITION AND UNCONSTRAINED OPTIMIZATION FOR A MULTI-ROTOR AIRCRAFT

(75) Inventor: Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 419 days.

(21) Appl. No.: 11/058,812

(22) Filed: Feb. 16, 2005

(51) Int. Cl.
G06F 17/10 (2006.01)
(52) U.S. Cl. .................. 701/3; 701/29; 702/56
(58) Field of Classification Search ............ None
See application file for complete search history.

(56) References Cited

U.S. PATENT DOCUMENTS

| 3,945,256 | A | 3/1976 | Wilson et al. |
| 4,937,758 | A | 6/1990 | Hayden et al. |
| 4,999,534 | A | 3/1991 | Andrianos |
| 5,049,795 | A | 9/1991 | Moulds, III |
| 5,206,816 | A | 4/1993 | Hill et al. |
| 5,316,240 | A | 5/1994 | Girard et al. |
| 5,471,880 | A | 12/1995 | Lang et al. |
| 5,815,307 | A | 9/1998 | Arbore et al. |

(Continued)

FOREIGN PATENT DOCUMENTS

GB       2 159 484      12/1985

OTHER PUBLICATIONS

Ventres, S., et al., "Rotor Tuning Using Vibration Data Only", presented at the American Helicopter Society 56th Annual Forum, Virginia Beach, Virginia, May 2-4, 2000.

(Continued)

Primary Examiner—Michael J. Zanelli
(74) Attorney, Agent, or Firm—Muirhead and Saturnelli, LLC

(57) ABSTRACT

Determining adjustments to decrease vibrations caused by rotating blades from a plurality of rotors includes determining a first plurality of adjustment normalization values for a plurality of possible adjustments of blades of a first one of the plurality of rotors, where the first plurality of adjustment normalization values normalizes different types of adjustments having different units, determining a second plurality of adjustment normalization values for a plurality of possible adjustments of blades of a second one of the plurality of rotors, where the second plurality of adjustment normalization values normalizes different types of adjustments having different units and where, for a particular adjustment type, an adjustment normalization value of the first plurality of adjustment normalization values is independent of a corresponding adjustment normalization value of the second plurality of adjustment normalization values for the particular adjustment type, providing coefficient of vibration data that corresponds to effects on vibration caused by adjustments to the blades, receiving a plurality of vibration values corresponding to vibrations caused by the blades, applying the coefficient of vibration data and the first and second plurality of adjustment normalization values to the vibration values to provide a set of total normalized vibration values corresponding to sets of possible adjustments to be applied to the blades, and selecting a set of adjustments having a total normalized vibration value less than a predetermined value and corresponding to a lower total amount of adjustment than other sets of adjustments having a total normalized vibration value less than the predetermined value. The predetermined value may correspond to an expected value of all errors.

20 Claims, 6 Drawing Sheets

U.S. PATENT DOCUMENTS

| | | |
|---|---|---|
| 5,990,712 A | 11/1999 | Corman et al. |
| 6,094,989 A | 8/2000 | Twerdochlib |
| 6,099,254 A | 8/2000 | Blaas et al. |
| 6,208,949 B1 | 3/2001 | Eatwell |
| 6,415,206 B1 | 7/2002 | Ventres |
| 6,567,757 B2 | 5/2003 | Bechhoefer et al. |
| 6,574,572 B2 * | 6/2003 | Bechhoefer .................. 702/56 |

OTHER PUBLICATIONS

Ventres, S., "Rotor Balancing Without A Tracker", Digital Systems Sciences/Vibro-meter/Meggitt PLC, Middletown, RI, USA, Paper No. 83, Oct. 2000.

Bechhoefer, E., et al., "IMD HUMS Rotor Track and Balance Techniques", (c) 2003.

* cited by examiner

REDUCING VIBRATION USING QR DECOMPOSITION AND UNCONSTRAINED OPTIMIZATION FOR A MULTI-ROTOR AIRCRAFT

BACKGROUND OF THE INVENTION

1. Field of the Invention

This application relates to the field of vibration analysis and more particularly to the field of performing vibration analysis for the purpose of providing device adjustments that reduce vibrations.

2. Description of Related Art

Rotors which propel helicopters and other propeller-driven aircraft induce vibrations in the structure supporting the rotor. The vibrations occur at frequencies that correspond to the shaft rotation rate and harmonics thereof. The vibrations may result in a structural damage, crew fatigue, and ultimately become one of the factors limiting the maximum forward speed of the aircraft. Similar types of vibrations are produced by fans and compressors and fixed installations as well as by marine propellers.

A primary source of the vibration problem is non-uniform air loads on the blades, although mass imbalance is not uncommon. Aerodynamic anomalies, however, tend to develop recurrently due to blade wear, damage, deformation, etc. The aerodynamic and mass and stiffness distribution anomalies have often been called "tracking faults", since a primary observable feature of the uneven airloads or mass distribution is it tendency for the blades to flap and/or deflect unevenly, and thus follow different "tracks". The troublesome manifestation of the aerodynamic and mass imbalance, however, is usually the 1/rev and n/rev vibrations and not the track deviations themselves.

It is possible to modify the vibration characteristics of a helicopter by "rotor trimming", which involves adjusting the weight of the blades at the hub, the tab setting at one or more blades, and the adjustment on the pitch rods. However, determining the effect of each of these adjustments may be difficult because the interdependence of the adjustments. This interdependence may be the source of some difficulty with trial and error methods of rotor trimming, which may allow variation of only one type of adjustment at a time. One set of adjustments may be thrown out of kilter by a subsequent step in the process, requiring repetitive adjustments which may or may not converge to an acceptable state.

Some helicopter rotor trim balancing methods rely, at least in part, upon making the track of each blade identical using, for example, known optical methods. Optical methods, however, employ bulky equipment which relies upon an operator in the co-pilot seat and procedures which require considerable flight time. Furthermore, optical methods cannot always "see" the blades during a complete revolution and thus cannot be expected to achieve perfect aerodynamic trim. Thus, it is desirable to trim the rotor without having to resort to optical tracking. Fortunately, mechanically balancing the rotors to reduce vibrations often has the desirable effect of improving the rotor track.

Mechanical balancing of rotors with mass imbalance may, in some cases, be performed with a single accelerometer and a shaft-phase reference sensor. However, uneven air loads may not be fully diagnosed and corrected with such a technique. Other techniques used to perform the rotor smoothing function may rely upon optical tracking in conjunction accelerometers. Known rotor smoothing systems, however, process vibration data in such a way that there may be an inherent ambiguity in the interpretation of the signatures. The ambiguity comes about because, in many cases, the number of channels processed simultaneously is inadequate to fully separate translational and rotational acceleration components at a given point. Thus, the motion of the helicopter (and in particular the rotor support) in response to a rotor anomalies may be incompletely specified. Furthermore, some systems may not deduce the corrections needed from the Fourier coefficients related to each anomaly.

U.S. Pat. No. 4,937,758, which is incorporated herein by reference, attempts to address these problems by disclosing techniques that take into account the interdependence of the adjustments. However, the system disclosed therein suffers from drawbacks, including difficulties in adequately relating different types of adjustments to each other and difficulties associated with specifying adjustments that do not take into account acceptable granularity and quantization of the adjustments. Furthermore, it is also desirable to minimize the risk associated with a proposed adjustment where the risk corresponds to the size of the adjustment when compared to the maximum allowable adjustment of that type (i.e., it is more risky to make a large adjustment than a small one). In addition, in some instances it is desirable to be able to correlate risks associated with different types of adjustments (e.g., compare the risk associated with an N ounce hub weigh adjustment with the risk associated with an M degree tab bend).

U.S. Pat. No. 6,567,757 addresses some of the issues discussed above, but does not present a solution for an aircraft having more than one rotor.

SUMMARY OF THE INVENTION

According to the present invention, determining adjustments to decrease vibrations caused by rotating blades from a plurality of rotors includes determining a first plurality of adjustment normalization values for a plurality of possible adjustments of blades of a first one of the plurality of rotors, where the first plurality of adjustment normalization values normalizes different types of adjustments having different units, determining a second plurality of adjustment normalization values for a plurality of possible adjustments of blades of a second one of the plurality of rotors, where the second plurality of adjustment normalization values normalizes different types of adjustments having different units and where, for a particular adjustment type, an adjustment normalization value of the first plurality of adjustment normalization values is independent of a corresponding adjustment normalization value of the second plurality of adjustment normalization values for the particular adjustment type, providing coefficient of vibration data that corresponds to effects on vibration caused by adjustments to the blades, receiving a plurality of vibration values corresponding to vibrations caused by the blades, applying the coefficient of vibration data and the first and second plurality of adjustment normalization values to the vibration values to provide a set of total normalized vibration values corresponding to sets of possible adjustments to be applied to the blades, and selecting a set of adjustments having a total normalized vibration value less than a predetermined value and corresponding to a lower total amount of adjustment than other sets of adjustments having a total normalized vibration value less than the predetermined value. The predetermined value may correspond to an expected value of all errors. Determining adjustments to decrease vibrations caused by rotating blades from a plurality of rotors may also include performing an FFT on the vibration data, where the data indicating effects on vibration is provided in the frequency domain and where applying the coefficient of vibration data and the first and second plurality of adjustment normalization values to the vibration values is performed in the frequency domain. The vibration values, the coefficient of vibration data, the first plurality of adjustment normalization values, the second plurality of adjustment normalization values, and the adjustments may all be matrixes and the vibration values may include a first matrix, u, corresponding to measured vibrations and a second matrix, v, corresponding to desired vibrations. Selecting a set of adjustments may include solving for possible values for the adjustments using the equation: $v=u+X \cdot a$, where a represents the adjustment and X represents the coefficient of vibration data. Solving for possible values of the adjustments may include replacing X with $Q \cdot R$, where $Q^T \cdot Q$ equals the identity matrix, I, and R is an upper triangular matrix and solving for possible values of the adjustments may include evaluating $|Q^T \cdot u + R \cdot a|$. a may be determined using a numeric technique to find a local minimum for $a^T \cdot (WF \cdot E) \cdot a$ subject to a constraint that $|Q^T \cdot u + R \cdot a|$ is less than the predetermined value, where E is a diagonal matrix having elements corresponding to a predetermined scaling amount for each type of adjustment and where WF is a weight factor matrix. Determining adjustments to decrease vibrations caused by rotating blades from a plurality of rotors may include determining the local minima using a Newton-Raphson technique. A first portion of the plurality of vibration values may correspond to a first flight condition and a second portion of the plurality of vibration values may correspond to a second flight condition different from the first flight condition. The plurality of vibration values may correspond to a flight condition of a helicopter selected from the group consisting of: being on the ground, hovering, operating within a predetermined speed range, and operating at a predetermined speed.

According further to the present invention, computer software that determines adjustments to decrease vibrations caused by rotating blades from a plurality of rotors includes data storage media containing a first plurality of adjustment normalization values for a plurality of possible adjustments of blades of a first one of the plurality of rotors, where the first plurality of adjustment normalization values normalize different types of adjustments having different units, data storage media containing a second plurality of adjustment normalization values for a plurality of possible adjustments of blades of a second one of the plurality of rotors, where the second plurality of adjustment normalization values normalize different types of adjustments having different units and where, for a particular adjustment type, an adjustment normalization value of the first plurality of adjustment normalization values is independent of a corresponding adjustment normalization value of the second plurality of adjustment normalization values for the particular adjustment type, data storage media containing coefficient of vibration data that corresponds to effects on vibration caused by adjustments to the blades, executable code that receives a plurality of vibration values corresponding to vibrations caused by the blades, executable code that applies the coefficient of vibration data and the first and second plurality of adjustment normalization values to the vibration values to provide a set of total normalized vibration values corresponding to sets of possible adjustments to be applied to the blades, and executable code that selects a set of adjustments having a total normalized vibration value less than a predetermined value and corresponding to a lower amount of adjustment than other sets of adjustments having a total normalized vibration value less than the predetermined value. The predetermined value may correspond to an expected value of all errors. The computer software may also include executable code that performs an FFT on the vibration data, wherein the data indicating effects on vibration is provided in the frequency domain and wherein applying the coefficient of vibration data and the first and second plurality of adjustment normalization values to the vibration values is performed in the frequency domain. The vibration values, the coefficient of vibration data, the first plurality of adjustment normalization values, the second plurality of adjustment normalization values, and the adjustments may all be matrixes and the vibration values may include a first matrix, u, corresponding to measured vibrations and a second matrix, v, corresponding to desired vibrations. Executable code that selects a set of adjustments may solve for possible values for the adjustments using the equation: $v=u+X \cdot a$, where a represents the adjustment and X represents the coefficient of vibration data. Solving for possible values of the adjustments may include replacing X with $Q \cdot R$, where $Q^T \cdot Q$ equals the identity matrix, I, and R is an upper triangular matrix and solving for possible values of the adjustments may include evaluating $|Q^T \cdot u + R \cdot a|$. a may be determined using a numeric technique to find a local minimum for $a^T \cdot (WF \cdot E) \cdot a$ subject to a constraint that $|Q^T \cdot u + R \cdot a|$ being less than the predetermined value, where E is a diagonal matrix having elements corresponding to a predetermined scaling amount for each type of adjustment and where WF is a weight factor matrix. The computer software may also include executable code that determines said local minima using a Newton-Raphson technique.

According further to the present invention, a system that determines adjustments to decrease vibrations caused by rotating blades from a plurality of rotors includes a plurality of accelerometers that provide a plurality of vibration values corresponding to vibrations caused by the blades and a main processing unit, coupled to the accelerometers, having a memory with a first plurality of adjustment normalization values for a plurality of possible adjustments of blades of a first one of the plurality of rotors, where the first plurality of adjustment normalization values normalizes different types of adjustments having different units, the memory also having a second plurality of adjustment normalization values for a plurality of possible adjustments of blades of a second one of the plurality of rotors, where the second plurality of adjustment normalization values normalizes different types of adjustments having different units and where, for a particular adjustment type, an adjustment normalization value of the first plurality of adjustment normalization values is independent of a corresponding adjustment normalization value of the second plurality of adjustment normalization values for the particular adjustment type, the memory also having coefficient of vibration data that corresponds to effects on vibration caused by adjustments to the blades, the main processing unit also having executable code that applies the coefficient of vibration data and the first and second plurality of adjustment normalization values to the vibration values to provide a set of total normalized vibration values corresponding to sets of possible adjustments to be applied to the blades and executable code that selects a set of adjustments having a total normalized vibration value less than a predetermined value and corresponding to a lower total amount of adjustment than other sets of adjustments having a total normalized vibration value less than the predetermined value. The main processing unit may include an output that provides data to a storage card and/or a display.

DETAILED DESCRIPTION OF THE PREFERRED EMBODIMENT(S)

Figure 1:
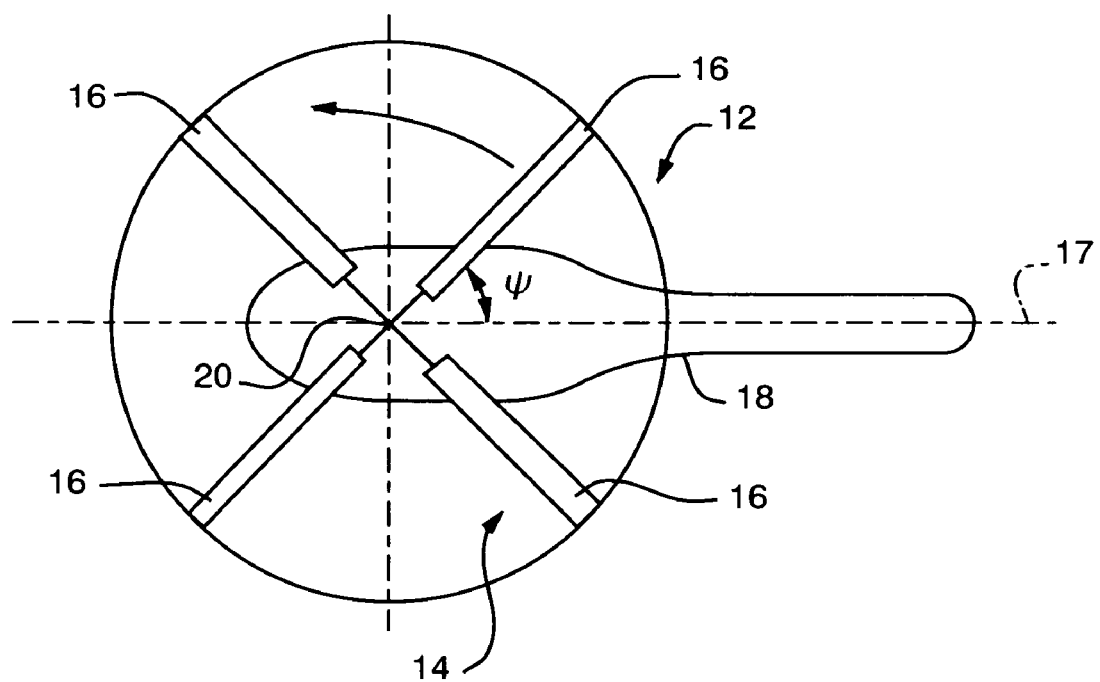
FIG. 1 shows a helicopter that uses the system described herein for measuring and analyzing vibrations.

Referring to FIG. 1, a helicopter 12 is shown having a rotor 14 with a plurality of blades 16. One of the blades 16 may be selected as a reference blade and each of the other blades 16 may be assigned a blade number starting with zero for the reference blade and increasing by one in the direction of rotation. For example, for the four-blade rotor 14 shown in FIG. 1, the blades may be numbered zero through three. Note that the system described herein may work with a different number of blades such as seven. Generally, for a system with B blades, the blades may each have an assigned blade number from zero through B−1. In addition, in some embodiments, the blades 16 may be identified by assigning a unique color to each blade.

Rotation of the blades 16 generates vibrations in the helicopter 12. As described in more detail below, the vibrations may be measured by sensors and then used as inputs to a process that determines adjustments that can be made to the blades 16 to reduce the vibrations. In some embodiments, the adjustments include hub weights, trailing edge tabs, and PCR changes. Other embodiments may also include tip weights of the blades.

The position of the reference blade may be defined by an azimuth angle $\psi$ between the blade itself and a center line 17 of the fuselage 18 of a rotor hub 20 of the helicopter 12. The blades 16 may be equally spaced, so that the position of a blade may be given by the expression $\psi+(b*\alpha)$, where $\alpha=2\pi/b$ is the inter-blade spacing angle and b is the blade index number, which runs from zero through B−1.

As the rotor 14 turns, the angle v increases. One complete rotation corresponds with an increase in $\psi$ of $2\pi$ radians or 360°. The rate of rotation of the rotor 14 is usually controlled by an engine governor and thus is substantially constant. Therefore, the azimuth angle is proportional to time, T, and thus may be expressed in terms of T. If the rate of rotation is designated by $\omega$, then $\psi=\omega*T$. In addition, because of the simple relationship between Azimuth angle and T, $\psi$ may also be used as a "dimensionless" measure of time. Motions of the blades 16 and forces of rotor 14, which may normally be thought of as being functions of time, may also be expressed as functions of $\psi$.

Figure 2:
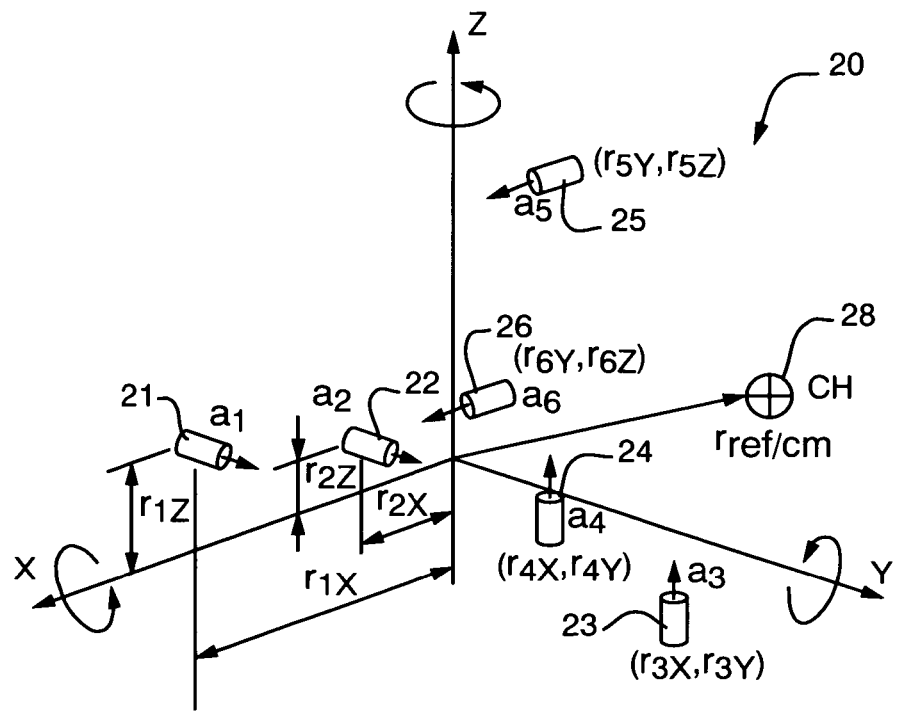
FIG. 2 illustrates a possible placement of accelerometer sensors according to the system described herein.

Referring to FIG. 2, a sensor array 20 includes a plurality of sensors 21-26 that measure vibration of the helicopter 12 near a center of mass at a point 28. The system described herein may be expanded to accommodate additional sensors. In some embodiments, the sensors 21-26 may be arranged in a cube which is mounted so as to allow direct computation of three orthogonal translation and three orthogonal rotational accelerations, as described elsewhere herein. Examples of commercially available sensors that may be used include Part No. CE581M101 Uniaxial accelormeter and/or the Part No. 44-581-000-121 BiAxial Accelormeter, both manufactured by Vibro-Meter Corp.

The sensors 21-24 may be rigidly attached to the helicopter 12, ideally near the center of mass 28 thereof. The x, y, z position of each of the sensors 21-24 with respect to the center of mass 28 may be known, as well as the positive sensing direction of each of the sensors 21-26 and the sensitivities thereof. In addition, the angular position of the rotor 14 may be sensed by one or more tachometers (not shown) that sense the relative position of each of the blades 16 with respect to the center line 17 of the helicopter 12.

The array of sensors 21-26 shown in FIG. 2 utilizes six one degree of freedom accelerometers which may be mounted in pairs. The six uniaxle accelerometers 21-26 may be mounted in convenient positions around the rigid framework of the helicopter 12 such that each of the sensors 21-26 has an axis of sensitivity parallel to one of the reference axes shown in FIG. 2. The location of each of the sensors 21-26 may be specified by first picking a reference point that can be any convenient point on the rigid framework of the helicopter 12 (e.g., a bolt head). If the point that is chosen has known coordinates with respect to the center of mass 28, processing is simplified. From the chosen reference point, which has a reference coordinate system that is parallel to the global coordinate system of the helicopter 12, the cartesian coordinates of the location of each of the sensor 21-26 may be determined. The coordinates may be represented by $r_{ab}$, where the "a" denotes the number of the sensor and the "b" denotes the component axis thereof.

Figure 3:
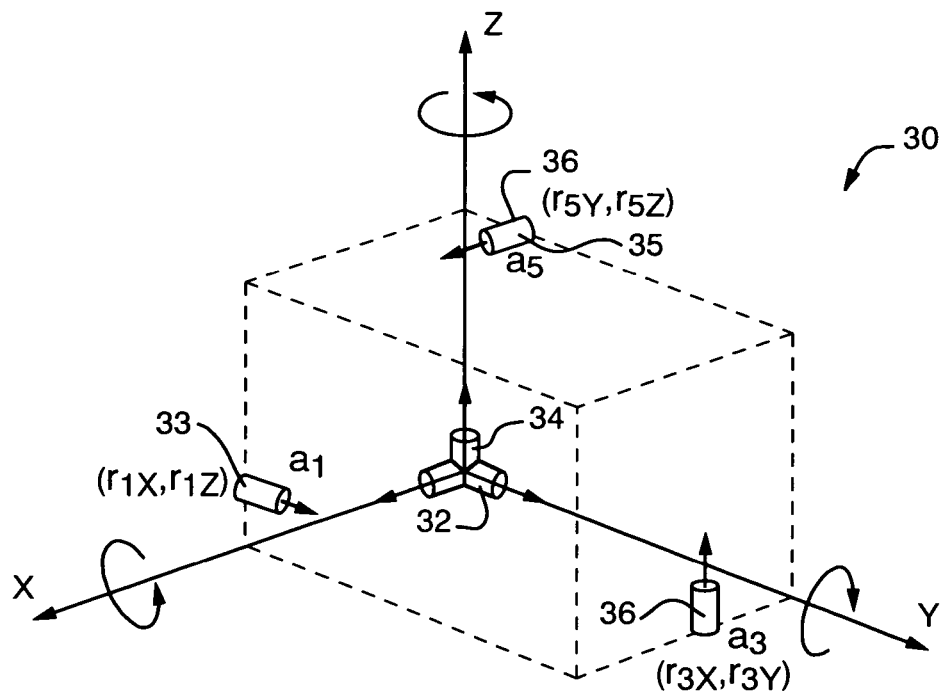
FIG. 3 illustrates an alternative possible placement of sensors according to the system described herein.

Referring to FIG. 3, another embodiment of a sensor array 30 includes a single triaxle accelerometer 32 and three one degree of freedom accelerometers 33-35. The array 30 may use the location of the triaxle accelerometer 32 as a reference point. The output of the triaxle accelerometer 32 may be sufficient to determine the translational acceleration vector of a reference point. Note the array 30 requires fewer sensor locations than the embodiment of FIG. 2. The locations of the three uniaxle accelerometers 33-35 may be determined in a manner somewhat similar to that described above in connection with FIG. 2. Note that the sensor array 20 or the sensor array 30 may be positioned on a single frame to form a six degree of freedom accelerometer and that the frame may be attached to the helicopter 12 as a single entity.

For a system utilizing either the array 20 of FIG. 2 or the array 30 of FIG. 3, the magnitude of the accelerometer vectors, as measured by the accelerometers, are given as $a_1$, $a_2$, $a_3$, $a_4$, $a_5$, and $a_6$. The reference coordinate axes may be parallel to the mass center line coordinate axes. The position vector from the reference point to the center of mass 28 may be given by $r_{ref/cm}$ with components $x_{ref/cm}$, $y_{ref/cm}$ and $z_{ref/cm}$ measured from the reference point to the center mass 28. Note also that the array 20 and/or the array 30 may be part of a portable system that is placed in the helicopter 12 as needed in connection with obtaining data for analysis.

Figure 4:
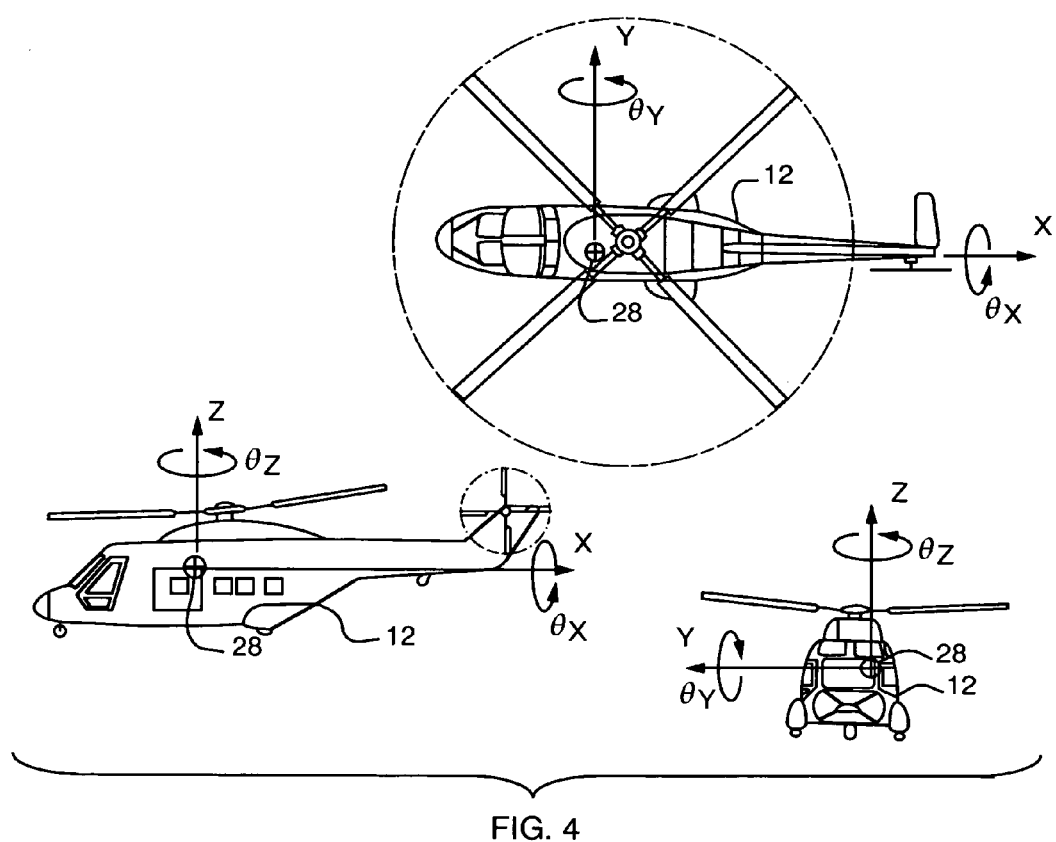
FIG. 4 illustrates different motions detected by the sensors of FIG. 2 and FIG. 3 according to the system described herein.

Referring to FIG. 4, the helicopter 12 is shown from three different positions where the axes of acceleration and the x, y, z and the corresponding rotational accelerations are shown from the center of mass point 28.

Note that the measurements from the sensors may be combined to provide measurement signals of "virtual sensors", which represent vibration values that are desirable to measure and correct for. For example, it may be desirable to have a virtual sensor for the pilot/co-pilot vertical vibrations, which will be determined by, for example, adding the signals from a pair of sensors having vertical axes of orientation near the positions of the pilot and copilot. Similarly, it may be desirable to have a cabin roll virtual sensor, which is determined by taking the difference of the pair of sensors used to determine pilot and copilot vertical vibrations. In one embodiment, the virtual sensors that are measured and processed include pilot/co-pilot vertical, cabin vertical, cabin roll, pilot/co-pilot lateral, cabin lateral, and cabin longitudinal. Note that the pilot/co-pilot lateral virtual sensor may be different from the cabin lateral virtual sensor because the cabin space may move laterally relative to the pilot/co-pilot space in some instances. For the discussion that follows, it is assumed that the sensor inputs that are being processed are the six sensor inputs (virtual sensors) listed above. However, it will be appreciated by one of ordinary skill in the art that different sensors (real and/or virtual) may be used to provide the system described herein.

Figure 5:
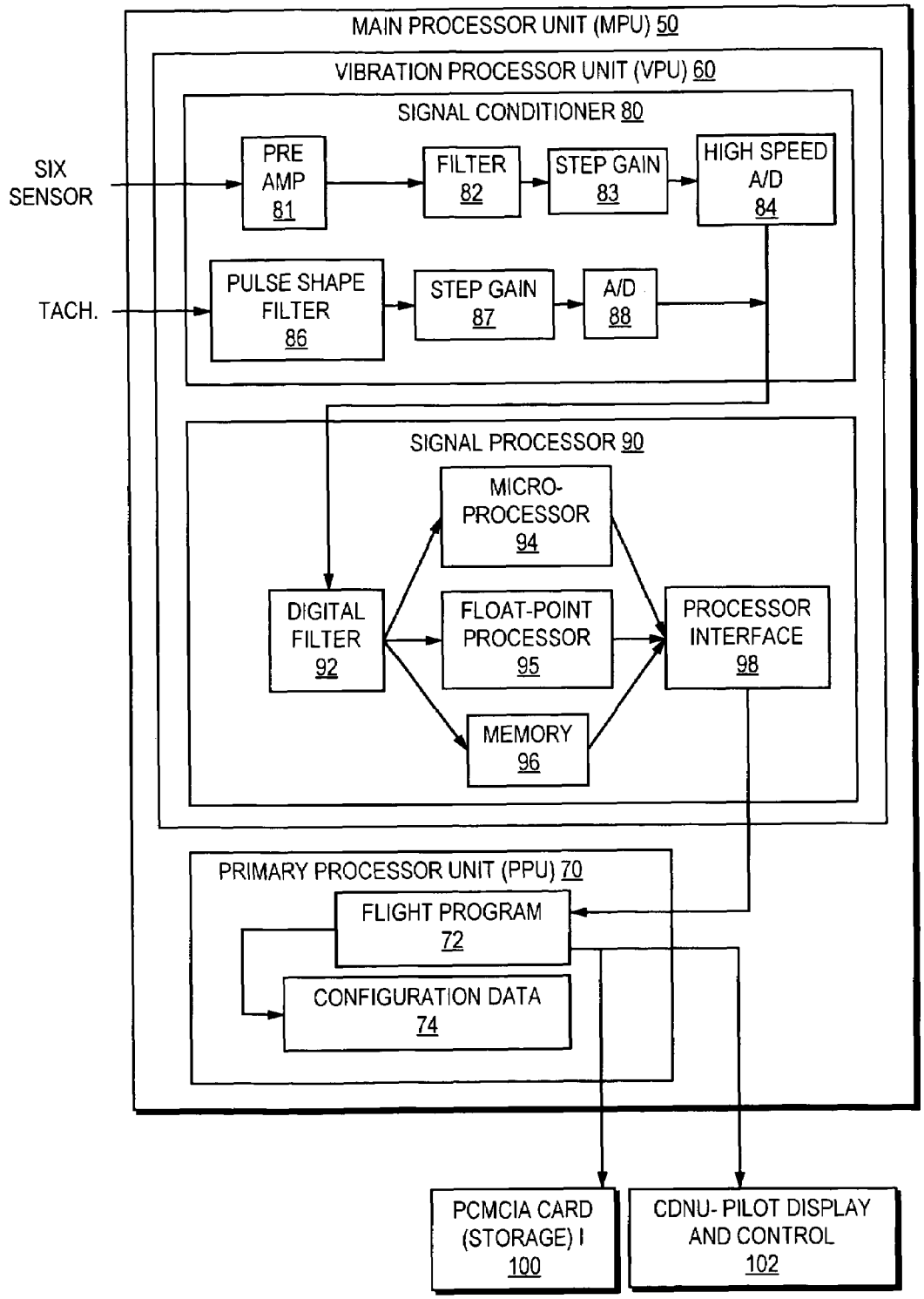
FIG. 5 illustrates processing of accelerometer signals according to the system described herein.

Referring to FIG. 5, data from the six sensors and data from the tachometer(s), which measures the angular displacement of the rotor 14, may be input to a main processor unit 50 which calculates vibrations of the helicopter 12. The main processor unit 50 includes a vibration processor unit 60 and a primary processor unit 70 which are interconnected in a conventional manner. The primary processor unit 70 includes a flight program unit 72 and configuration data unit 74, which are described in more detail herein. The vibration processor unit 60 may be in the same location or a different location than the primary processor unit 70. Similarly, at least some portion(s) of the main processor unit 50 may be fixedly installed in the helicopter 12. Alternatively, the entirety of the main processor unit 50 may be a portable device that is used as needed in connection with analyzing vibrations.

The vibration processor unit 60 includes a signal conditioner 80 and a signal processor 90 connected thereto. The signal conditioner 80 performs initial processing on the six sensor signals and the tachometer signal. The signal processor 90 processes the output of the signal conditioner 80 to provide calculations of the vibrations, as described elsewhere herein.

The signal conditioner 80 includes six pre-amplifiers 81 (one for each of the sensors) for pre-amplifying data input to the signal conditioner 80. Alternatively, the pre-amplifier 81 may be a single pre-amplifier with six channels, or some other arrangement capable of providing pre-amplification of the six sensor signals.

The output of the pre-amplifier 81 is provided to a filter 82, which filters out noise from the signals. In some embodiments, the filter 82 is a low pass filter. The output of the filter 82 is provided to a step gain 83, which adjust the gain of the signals as appropriate for input to a high speed A/D converter 84. The step gain 83 and the high speed A/D converter 84 cooperate to provide an efficient signal range for the processing described herein.

The tachometer signal (or multiple tachometer signals, depending upon the specific implementation) are applied to a pulse shape filter 86 which buffers and provides a low pass filtering of the signal(s) from the tachometer. The output of the pulse shape filter 86 is provided to a step gain 87 and the output of the step gain 87 is provided to an A/D converter 88. As with the sensor signals, the step gain 87 and the A/D converter 88 cooperate to provide an efficient range of signal. The output of the A/D converter 88 and the output of the high speed A/D converter 84 are combined to provide the digital signal output of the signal conditioner 80. Thus, the output of the signal conditioner 80 is the sampled sensor signals and sampled tachometer signal in digital form.

The signal processor 90 receives the output from the signal conditioner 80. The signal processor 90 includes a digital filter 92 that filters the incoming data. The output of the digital filter 92 is provided to a microprocessor 94, a floating point processor 95, and a memory 96, which are arranged in a conventional manner to provide the functionality described herein. The output of the microprocessor 94, and the floating point processor 95, and the memory 96 are provided to a processor interface 98.

The signal processor 90 performs a Fast Fourier transform (FFT) on the input provided thereto from the signal conditioner 80. The FFT converts the time domain data from the six sensors to corresponding Fourier coefficients at a selectable number of harmonics of the 1/rev fundamental. The rotation signal from the tachometer is used to determine the fundamental frequency which is a multiple of the rotation rate of the blades 16.

The output of the signal processor 90 is provided to the primary processor unit 70, which is described in more detail elsewhere herein. The output of the signal processor 90 may also be provided to a storage card 100 and may be displayed to the pilot during flight (or on the ground) with a pilot display and control unit 102.

The sensor data that is collected and provided to the storage card 100 and/or the pilot display and control unit 102 may be used to determine appropriate helicopter blade adjustments to the hub weights, PCR's, and blade tabs (and possibly blade tip weights) to reduce vibration of the helicopter. The algorithm for determining the adjustments may be run either on the pilot display and control unit 102 or may be run using a conventional processor (computer) that is not fixedly installed in the helicopter 12 and/or is not used at all in connection with the helicopter 12. In any case, the algorithm uses the collected sensor data to determine blade adjustments for reducing vibrations.

The sensor data may be collected under different flight conditions, known as "regimes", so that the algorithm for determining blade adjustments that reduce vibrations does so for all regimes and/or is optimized to reduce vibrations for a specific subset of regimes. The regimes may include, for example, the helicopter being on the ground, hovering, 90 knots, 120 knots, and 150 knots. During the data collection process, the pilot may indicate that the helicopter is in a particular regime by pressing a button or otherwise providing appropriate input to the system by, for example, pressing a button on the pilot display and control unit 102. Alternatively, the system may determine when the aircraft is in a particular regime and initiate data collection automatically. Thus, there may be vibration data for each of the sensors (virtual sensors) collected at each of the regimes.

Figure 6:
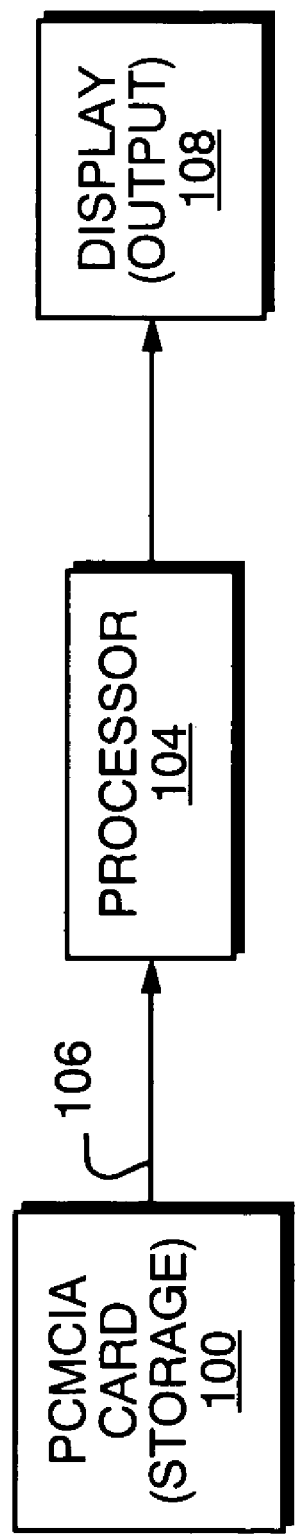
FIG. 6 illustrates a processor for analyzing vibration data according to the system described herein.

Referring to FIG. 6, the storage card 100 is shown being coupled to a processor 104 via a connection 106 therebetween. Collected data may be provided to the processor 104 which determines adjustment information for the blades 16 as described herein. The adjustment information may be provided by the processor 104 to an output, such as a display 108, so that a user, such as a helicopter maintainer, can view the information to determine how to adjust the blades 16. The processor 104 may be implemented by any one of a variety of off-the-shelf computing systems capable of providing the functionality described herein.

A system for indicating blade adjustments to decrease vibrations may include empirical data that indicates the effect of each adjustment. That is, there may be empirical data that provides the change in the vibration caused by each type of adjustment. For example, there may be data that shows that at a particular regime, for a particular sensor (virtual sensor), adjusting the tabs of a blade a particular unit amount effects the vibration a particular amount. The calculations and analysis are performed in the frequency domain because in the frequency domain it is possible to assume a linear relationship between the adjustments and the effects the adjustments have on vibration in the frequency.

Fourier components (amplitude and phase) of the incremental accelerations caused by unit adjustments of the reference blade, (e.g., a 1 degree deflection of a tab, a pitch link adjustment which causes a 1 degree change in blade angle of attack, etc.) are also used. This data may be obtained from flight test data using the system described herein by systematically making adjustments and either changing the Fourier coefficients or performing an analysis and using the data that is specific to each particular helicopter configuration and operating condition. From the data (which pertains to unit adjustments applied to the reference blade), acceleration caused by similar adjustments to other blades may be computed. Based upon a dynamic model of the rotor system, a particular set of adjustments which most nearly negates the measured acceleration (thereby minimizing vibration) is computed.

To simplify a description of the procedure involved, an example will be discussed which considers only one type of rotor blade adjustment, the trailing edge tab settings, and only one flight condition, which need not be specified. The acceleration generated at the rotor hub 20 by a one degree downward deflection of the trailing edge tab on a reference blade might be denoted by the function $T(\psi)$. (Note that $T(\psi)$ may be a vector-valued function having three components $T_{x(\psi)}$, $T_{y(\psi)}$ and $T_{z(\psi)}$, denoting accelerations along each of three orthogonal directions.)

The acceleration generated by a similar 1 degree deflection of the tab on blade b is then $T(\psi+b\Delta)$, and the acceleration caused by a deflection in the amount $a_b$ is $$a_b T(\psi+b\Delta)$$

Finally, the acceleration generated by deflections in the amounts provided on the blades b=0, 1 ... B–1, which may be denoted by $a_{tab}$ is $$a_{tab} = \sum_{b=0}^{B-1} a_b T(\psi + b\Delta)$$

In steady flight, $T(\psi)$ is a periodic function, as all forces generated by the rotor repeat themselves at the interval of rotation of the rotor. Therefore, $T(\psi)$ can be expressed as a Fourier series:

$$T(\psi) = \sum_n T_n e^{-in\psi}$$

In the complex exponential form of the series shown above, the index n is summed over all integers, positive and negative. From hereon in the detailed description where no summation limits are shown, such an indefinite summation is intended.

Generally speaking, the permitted blade adjustments generate pronounced forces and moments at the rotor rotation rate, and have much less effect at higher frequencies. For the complex Fourier series shown above, this means that the components n such that n=+/–1 are the largest in magnitude, and component indices greater than 1 or less than –1 are much smaller.

Using this Fourier series for a unit deflection of the tab on the reference blade, it can be shown that the acceleration $a_{tab}$ generated by arbitrary tab deflections on all blades is:

$$a_{tab} = \sum_n A_n T_n e^{-in\psi}$$

In the equation above, the set of quantities $\{A_n\}$ are the discrete Fourier transform of the set of tab deflections $\{a_b; b=0, 1 \ldots B-1\}$:

$$A_n = \sum_{b=0}^{B-1} a_b e^{-inb}$$

The $A_n$ are generally complex numbers. They form an infinite periodic sequence, the period being the number of blades, B. Because the tab settings $a_b$ are real numbers, the $A_n$ have the following property (*denotes the complex conjugate):

$$A_{B-n}=A_n{}^*$$

Combining this property with the periodicity of the sequence, it can be shown that $A_0$ is a real number, as is $A_{B/2}$, if B is even.

As can be seen in the equation for $a_{tab}$, the $A_n$'s form a frequency mask. If a particular $A_n$ is zero, then the corresponding frequency is not present in the Fourier series for the incremental acceleration caused by the tab settings, $a_b$. For example, if on a four blade rotor the trailing edge tabs on each pair of opposing blades are given the same setting, the associated blade forces and motions substantially replicate themselves twice each revolution, so that no net forces are generated at the rotor rotation rate.

The acceleration measured on an untrimmed rotor (the vibration which is to be minimized) is also a (vector-valued) periodic function, and so can be expressed as a complex $$a = \sum_n a_n e^{-in\psi}$$

Fourier Series:

This series is a mathematical representation of the data provided by the signal processor 90. Including now the additional acceleration caused by the tab deflections, the total acceleration can be calculated as:

$$a + a_{tab} = \sum_n (a_n + A_n T_n) e^{-in\psi}$$

The vibrations are thus analyzed in the frequency domain, allowing determination of many orders of effects.

A basic equation for analyzing the vibrations as well as the effect of adjustments to the blades is:

$$v = u + X \cdot a$$

where v represents the vibrations after adjustment, u represents the vibration before adjustment, a represents the adjustment, and X represents coefficient of vibration data that corresponds to effects on vibration caused by the adjustments. All of the quantities are multivalued and thus are represented as matrixes. The values for X are determined in a manner consistent with that described above for empirically determining the effect of adjustments on acceleration (vibration).

The matrixes u and v may be k by one matrixes where k equals the number of harmonic orders of interest (i.e., the number that are analyzed) multiplied by the number of regimes. If there are three adjustments (i.e., tabs, PCR's and hub weights), then a is a three by one matrix and X is a k by three matrix. Note that, if it is desirable to include tracking data, the data can be added to the u and v arrays and added to the X array in the same way that a new regime would be added. In that case, the calculations discussed herein for minimizing vibrations would, in fact, be minimizing and performing calculations on the combination of vibrations and track data.

The goal is to solve for a so that v represents a relatively low amount of vibration (or, as discussed above, a combination of vibration and track data, which will be hereinafter referred to as vibration for simplicity). The amount of vibration associated with v is $\|v\|$ (the norm of the matrix v). Ideally, it is desirable to drive $\|v\|$ to zero (i.e., have all entries of the matrix equal zero). However, doing so in many instances results in a somewhat large (and thus risky) set of suggested adjustments. In addition, since there may be errors inherent in the system due to errors in adjustment, measurement, calculating the effects of adjustments, etc., then it is not necessary to drive $\|v\|$ to zero. Instead, it is sufficient to cause $\|v\|$ to be less than a predetermined value, $\delta$. In some embodiments, $\delta$ may be set to the sum of all of the expected values of errors associated with an adjustment. Note that, although it may not be possible to know with certainty where errors are specifically occurring (e.g., the measurement of coefficients or the adjustments themselves), it is still possible to estimate the total expected error. Note further that different sets of adjustments that fall within the total expected error are indistinguishable in terms of predicting their ability to improve the vibration characteristics of the aircraft.

The following solves for the adjustment, a, using the constraint that $\|v\|<\delta$.

QR decomposition is a known technique that may be used to solve matrix equations. In this instance, matrixes Q and R are chosen so that Q·R equals X. In addition, QR decomposition provides that Q is such that $Q^T$·Q equals I, the identity matrix. Thus, $$v=u+Q\cdot R\cdot a$$

multiplying through by $Q^T$ yields:

$$Q^T\cdot v=Q^T\cdot u+R\cdot a$$

since $\|v\|<\delta$ and multiplying v by $Q^T$ simply scales the norm of v, then:

$$\|Q^T\cdot u+R\cdot a\|<\delta \text{ (or a different } \delta, \text{ scaled by } \|Q^T\|)$$

How the equation set forth above may be used to solve for a is discussed in more detail below.

In the course of solving for a, it is possible to find a solution in a way that minimizes vibrations at the fundamental frequency and/or the harmonics by performing the computations set forth above using a subset of the matrixes corresponding to the frequencies of interest. However, because the adjustments affect vibrations at all of the frequencies, in some instances it is possible that an adjustment will decrease vibrations at one frequency while increasing vibrations at another frequency. On the other hand, there is a relationship between the vibrations at various frequencies such that optimizing on the shaft order S provides for simultaneous adjustment on any frequency corresponding to the following:

$$(N\times B)+/-S$$

where N is an integer and B corresponds to the number of blades. Thus, optimizing on the first order frequency (i.e., S=1) for a seven blade helicopter also affects the 6th and 8th orders (N=1), the 13th and 15th orders (N=2), etc. In other words, $a_{F1}=a_{F2}$ in instances where F1 and F2 obey the relationship set forth above. Note that the even in instances where F1 and F2 meet the criteria set forth above, $X_{F1}$ does not necessarily equal $X_{F2}$.

Note that, for embodiments where the blade adjustments include hub weights, tabs, and PCR's, it is necessary to provide a mechanism to correlate the various values. Otherwise, it is difficult to determine how to compare, for example, one ounce of weight for a hub weight adjustment with one degree of tab deflection. In embodiments disclosed herein, adjustment values used, for example, in the X array and the a array, are normalized according to a maximum value for each adjustment. Thus, if the maximum hub weight adjustment is, for example, twenty ounces, then one ounce would be represented as 0.05. Similar normalization may be used for the PCR adjustments and the tab deflection adjustments (and possibly blade tip weight adjustments). Normalizing the adjustment values allows for computations that compare and/or combine the values. In addition, normalizing by one over the maximum allowable amount for each of the types of adjustment provides a weighting that compensates values for each type of adjustment according to the percent of the allowable range represented by a particular adjustment.

In one embodiment, normalization occurs by computing a weight norm matrix:

$$a^T\cdot E\cdot a$$

where E is a diagonal matrix where the diagonal elements equal the inverse of the maximum amount for each physical adjustment. Thus, if the maximum PCR adjustment is twenty clicks, the diagonal element of E corresponding to the PCR adjustment is $\frac{1}{20}$. That way, any PCR values in the a matrix are normalized according to the maximum PCT adjustment. Hub weight and tab adjustments are similarly normalized, thus making it possible to correlate the risks (i.e., the amount of change) associated with different types of adjustments. For example, for purposes of risk assessment, a weight adjustment that is one half of the maximum allowable weight adjustment is equivalent to a tab adjustment that is one half of the maximum allowable tab adjustment. Note that it is possible to normalize using values that are different from the maximum range of each of the adjustments.

The system discussed herein minimizes the weight norm matrix, $a^T\cdot E\cdot a$, subject to the constraint discussed above of $\|Q^T\cdot u+R\cdot a\|<\delta$. Minimization of $a^T\cdot E\cdot a$ may be performed using any one of a variety of conventional techniques, such as the Newton-Raphson technique.

Once an appropriate value for a is found, it is necessary to convert the calculated adjustment, which is expressed in the a matrix in the Fourier domain, back to a real adjustment. This may be performed by multiplying the a matrix by an inverse DFT matrix, where each of the rows of the inverse DFT matrix correspond to the blade to be adjusted and each of the columns corresponds to the adjustment type. Note that for a system with B blades, there will be B−1 rows since only B−1 blades (at the most) are adjusted. Note further that, for weight adjustments, only two blades at most need be adjusted.

The inverse DFT matrix is a B×B matrix. Elements of the inverse DFT matrix are given by:

$$\frac{1}{B}e^{i2\pi pb/B}, b, p = 1...B$$

where p and b indicate the position in the inverse DFT matrix.

In other embodiments, a different value for δ may be chosen. Note that it is possible to trade off values for δ and risk. That is, increasing δ would tend to decrease the risk by increasing the solution space for acceptable adjustments. Similarly, decreasing δ would tend to increase the risk.

Figure 7:
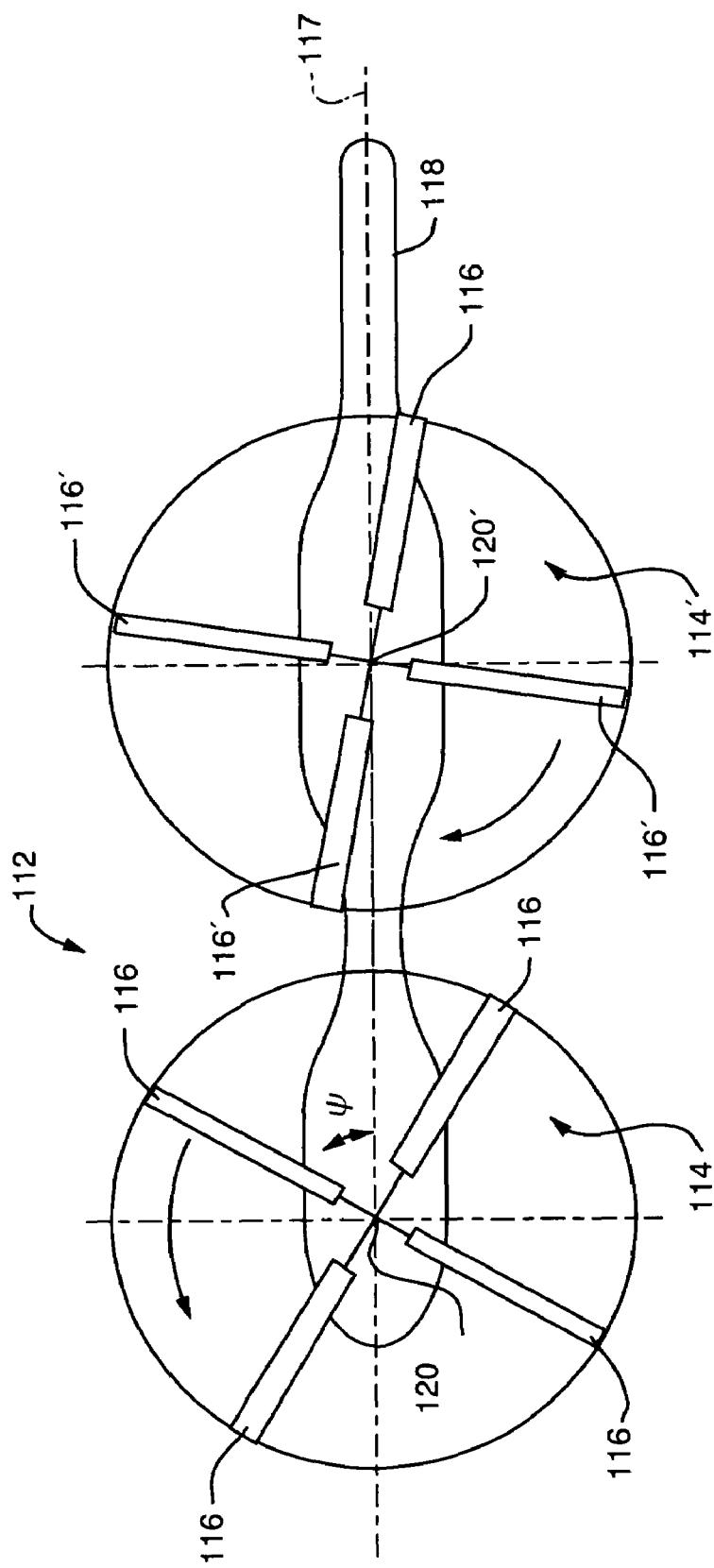
FIG. 7 shows a multi-rotor helicopter that uses the system described herein for measuring and analyzing vibrations.

Referring to FIG. 7, a helicopter 112 is shown having a fuselage 118 and two rotors 114, 114' each with a plurality of blades 116, 116'. In an embodiment herein, the rotor 114 has the same number of blades as the rotor 114'. One of the blades 116 of the rotor 114 may be selected as a reference blade and each of the other blades 116 may be assigned a blade number starting with zero for the reference blade and increasing by one in the direction of rotation. Similarly, one of the blades 116' of the rotor 114' may be selected as a reference blade and each of the other blades 116' may be assigned a blade number starting with zero for the reference blade and increasing by one in the direction of rotation. Generally, for a system where each of the rotors 114, 114' has B blades, the blades may each have an assigned blade number from zero through B−1. In addition, in some embodiments, the blades 116, 116' may be identified by assigning a unique color to each blade. In an embodiment herein, the rotor 114 has the same number of blades as the rotor 114'. Note that the system described herein may work with a different number of blades such as four or seven.

Rotation of the blades 116 generates vibrations in the helicopter 112 while rotation of the blades 116' generates additional vibrations in the helicopter 112. Just as with single rotor embodiments, discussed above, the vibrations may be measured by sensors and then used as inputs to a process that determines adjustments that can be made to the blades 116 and/or to the blades 116' to reduce the vibrations. In some embodiments, the adjustments may include hub weights, trailing edge tabs, and PCR changes for the blades 116 and a separate set of hub weights, trailing edge tabs, and PCR changes for the blades 116'. Other embodiments may also include tip weights of the blades.

Just as with the single rotor embodiments, discussed above, the position of the reference blade may be defined by an azimuth angle ψ between the blade itself and a center line 117 of the fuselage 118 that passes through rotor hubs 120, 120' of the helicopter 112. The blades 116, 116' may be equally spaced, so that the position of a blade on one of the rotors 114, 114' may be given by the expression ψ+(b*α), where α=2ψ/b is the inter-blade spacing angle and b is the blade index number, which runs from zero through B−1.

As the rotors 114, 114' turn, the angle ψ increases. One complete rotation corresponds with an increase in ψ of 2π radians or 360°. The rate of rotation of the rotors 114, 114' may be controlled by an engine governor and thus is substantially constant. In an embodiment herein, the rotors 114, 114' turn synchronously. Therefore, the azimuth angle is proportional to time, T, and thus may be expressed in terms of T. If the rate of rotation is designated by ω, then ψ=ω*T. In addition, because of the simple relationship between Azimuth angle and T, ψ may also be used as a "dimensionless" measure of time. Motions of the blades 116, 116' and forces of the rotors 114, 114', which may normally be thought of as being functions of time, may also be expressed as functions of ψ.

A sensor array, like the sensor array 20 discussed above, may be mounted at or near a center-of-mass point 128 of the helicopter. Alternatively, the sensor array may be mounted near one of the rotors 114, 114', or near a particular area of the helicopter 112 where it is desirable to minimize vibrations, such as the passenger compartment, the flight compartment, and/or the cargo bay of a cargo helicopter. Also, in an embodiment herein, multiple sensor arrays may be used where the cumulative vibration measured by all of the arrays is used, in which case a number of input sensor signal other than six (shown in FIG. 5) may be used. In some instances, the effects of different sensor arrays may be weighted to emphasize the effect of vibrations at one position of the helicopter 112 over other positions. For example, the effect of vibrations at a passenger compartment may be weighted to take precedence over the effect of vibrations in the flight compartment. Virtual sensors, discussed above, may also be employed when using multiple sensor arrays. Since the rotors 114, 114' are synchronous in an embodiment herein, a single tachometer, like the tachometer used in a single rotor embodiment, may be used.

Just as with the single rotor embodiment, the multi-rotor system may use the main processor unit 50, the storage card 100, and the pilot display and control 102 as well as the processor 104 and the display 108. Also, the data for a multi-rotor system may be collected and processed under different flight regimes. Generally, except as provided herein, determining adjustments for a multi-rotor system is analogous to determining adjustments for a single rotor system.

The effect of a single type of adjustment on overall vibration for a multi-rotor system is the same as that for a single rotor system. However, the number of possible adjustments, and possible interaction thereof, increases when there is more than one rotor.

The basic equation from above may be used so that:

$$v=u+X\cdot a$$

where v represents the vibrations after adjustment, u represents the vibration before adjustment, a represents the adjustment, and X represents coefficient of vibration data that corresponds to effects on vibration caused by the adjustments. All of the quantities are multivalued and thus are represented as matrixes. The values for X are determined in a manner consistent with that described above for empirically determining the effect of adjustments on acceleration (vibration).

The matrixes u and v may be k by one matrixes where k equals the number of harmonic orders of interest (i.e., the number that are analyzed) multiplied by the number of regimes. If there are three adjustments (i.e., tabs, PCR's and hub weights) per rotor and two rotors, then a is a six by one matrix and X is a k by six matrix. Note that, if it is desirable to include tracking data, the data can be added to the u and v arrays and added to the X array in the same way that a new regime would be added. In that case, the calculations discussed herein for minimizing vibrations would, in fact, be minimizing and performing calculations on the combination of vibrations and track data.

The goal is to solve for a so that v represents a relatively low amount of vibration (or, as discussed above, a combination of vibration and track data, which will be hereinafter referred to as vibration for simplicity). The amount of vibration associated with v is ‖v‖ (the norm of the matrix v). Ideally, it is desirable to drive ‖v‖ to zero (i.e., have all entries of the matrix equal zero). However, doing so in many instances results in a somewhat large (and thus risky) set of suggested adjustments.

In addition, since there may be errors inherent in the system due to errors in adjustment, measurement, calculating the effects of adjustments, etc., then it is not necessary to drive $\|v\|$ to zero. Instead, it is sufficient to cause $\|v\|$ to be less than a predetermined value, δ. In some embodiments, δ may be set to the sum of all of the expected values of errors associated with an adjustment. Note that, although it may not be possible to know with certainty where errors are specifically occurring (e.g., the measurement of coefficients or the adjustments themselves), it is still possible to estimate the total expected error. Note further that different sets of adjustments that fall within the total expected error are indistinguishable in terms of predicting their ability to improve the vibration characteristics of the aircraft.

Using QR decomposition, described above in the single rotor example, it is desirable to have the following:

$$\|Q^T \cdot u + R \cdot a\| < \delta \text{ (or a different } \delta, \text{ scaled by } \|Q^T\|)$$

Just as with the single rotor example discussed above, it is possible to find a solution in a way that minimizes vibrations at the fundamental frequency and/or the harmonics by performing the computations set forth above using a subset of the matrixes corresponding to the frequencies of interest. However, because the adjustments affect vibrations at all of the frequencies, in some instances it is possible that an adjustment will decrease vibrations at one frequency while increasing vibrations at another frequency. On the other hand, there is a relationship between the vibrations at various frequencies such that optimizing on the shaft order S provides for simultaneous adjustment on any frequency corresponding to the following:

$$(N \times B) +/- S$$

where N is an integer and B corresponds to the number of blades.

The mechanism discussed above for correlating blade adjustment values for single rotor embodiments may be applied to multi-rotor embodiments so that adjustment values used, for example, in the X array and the a array, are normalized according to a maximum value for each adjustment, so that normalization occurs by computing a weight norm matrix:

$$a^T \cdot E \cdot a$$

where E is a diagonal matrix where the diagonal elements equal the inverse of the maximum amount for each physical adjustment. However, it may be that in the case of having multiple rotors, it is desirable to prefer some types of adjustments over others or to prefer to adjustment of one rotor over others. For example, it may be desirable to, if possible, satisfy the constraint $\|Q^T \cdot u + R \cdot a\| < \delta$ by adjusting only one of two rotors or by minimally adjusting one of the two rotors.

Different emphasis may be placed on different adjustments by using a weight factor matrix, WF, to modify the normalization discussed above. In an embodiment herein, WF is a diagonal matrix having values that are inversely proportional to the desirability of performing a corresponding adjustment.

Thus, the quantity WF·E represents a scaling of the normalization matrix, E, to account for the desirability or undesirability of making different adjustments. If a particular adjustment is deemed relatively risky (and thus less desirable), the corresponding value in the WF matrix may be larger than for other adjustments deemed less risky (and thus more desirable). Of course, in instances where all adjustments are deemed equally risky (i.e., no adjustments are deemed more desirable over others), then WF is the identity matrix and WF·E=E.

In an embodiment herein, WF may cause adjustments for one rotor to be relatively desirable while adjustments for other rotors are relatively less desirable, even for the same type of adjustment. Thus, WF modifies the adjustments for one rotor independent of adjustments of the same type for another rotor. For example, it may be less desirable to adjust the tabs of blades of a first rotor than to adjust tabs of blades of a second rotor. In such a case, WF may be modified so that the effect of adjustments on the tabs of the blades of the first rotor are more pronounced (i.e., cause a greater increase in the normalized vibration value). In effect, E represents the normalization of different types of adjustments while WF represents different emphasis on different adjustments, including different emphasis of adjustments of the same type on different rotors.

Taking into account the weight factor matrix, WF, provides the following weight norm matrix:

$$a^{T*}(WF \cdot E) \cdot a$$

The system discussed herein minimizes the weight norm matrix, $a^T \cdot (WF \cdot E) \cdot a$, subject to the constraint discussed above of $\|Q^T \cdot u + R \cdot a\| < \delta$. Minimization of the weight norm matrix may be performed using any one of a variety of conventional techniques, such as the Newton-Raphson technique. The calculated adjustment, which is expressed in the a matrix in the Fourier domain, may be converted to a real adjustment in a manner similar to that discussed above in connection with the single rotor embodiment.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

The invention claimed is:

1. A method of determining adjustments of blades to decrease vibrations caused by rotating the blades from a plurality of rotors, comprising:

determining a first plurality of adjustment normalization values for a plurality of possible adjustments of blades of a first one of the plurality of rotors, wherein the first plurality of adjustment normalization values normalizes different types of adjustments having different units;

determining a second plurality of adjustment normalization values for a plurality of possible adjustments of blades of a second one of the plurality of rotors, wherein the second plurality of adjustment normalization values normalizes different types of adjustments having different units and wherein, for a particular adjustment type, an adjustment normalization value of the first plurality of adjustment normalization values is independent of a corresponding adjustment normalization value of the second plurality of adjustment normalization values for the particular adjustment type;

providing coefficient of vibration data that corresponds to effects on vibration caused by adjustments to the blades;

receiving a plurality of vibration values corresponding to vibrations caused by the blades;

applying the coefficient of vibration data and the first and second plurality of adjustment normalization values to the vibration values to provide a set of total normalized vibration values corresponding to sets of possible adjustments to be applied to the blades; and selecting a set of adjustments to be applied to the blades, the selected set of adjustments having a total normalized vibration value less than a predetermined value and corresponding to a lower total amount of adjustment than other sets of adjustments having a total normalized vibration value less than the predetermined value.

2. A method, according to claim 1, wherein the predetermined value corresponds to an expected value of all errors.

3. A method, according to claim 1, further comprising:
performing an FFT on the vibration data, wherein the data indicating effects on vibration is provided in the frequency domain and wherein applying the coefficient of vibration data and the first and second plurality of adjustment normalization values to the vibration values is performed in the frequency domain.

4. A method, according to claim 3, wherein the vibration values, the coefficient of vibration data, the first plurality of adjustment normalization values, the second plurality of adjustment normalization values, and the adjustments are all matrixes and wherein the vibration values include a first matrix, u, corresponding to measured vibrations and a second matrix, v, corresponding to desired vibrations.

5. A method, according to claim 4, wherein selecting a set of adjustments includes solving for possible values for the adjustments using the equation:

$$v = u + X \cdot a$$

where a represents the adjustment and X represents the coefficient of vibration data.

6. A method, according to claim 5, wherein solving for possible values of the adjustments includes replacing X with $Q \cdot R$, where $Q^T \cdot Q$ equals the identity matrix, I, and R is an upper triangular matrix and wherein solving for possible values of the adjustments includes evaluating $|Q^T \cdot u + R \cdot a|$.

7. A method, according to claim 6, wherein a is determined using a numeric technique to find a local minimum for $a^T \cdot (WF \cdot E) \cdot a$ subject to a constraint that $|Q^T \cdot u + R \cdot a|$ is less than the predetermined value, wherein E is a diagonal matrix having elements corresponding to a predetermined scaling amount for each type of adjustment and wherein WF is a weight factor matrix.

8. A method, according to claim 7, further comprising:
determining said local minima using a Newton-Raphson technique.

9. A method, according to claim 1, wherein a first portion of said plurality of vibration values correspond to a first flight condition, a second portion of said plurality of vibration values correspond to a second flight condition different from the first flight condition.

10. A method, according to claim 1, wherein said plurality of vibration values correspond to a flight condition of a helicopter selected from the group consisting of: being on the ground, hovering, operating within a predetermined speed range, and operating at a predetermined speed.

11. A computer-readable medium storing computer software that determines adjustments of blades to decrease vibrations caused by rotating the blades from a plurality of rotors, the computer-readable medium comprising:
data storage media containing a first plurality of adjustment normalization values for a plurality of possible adjustments of blades of a first one of the plurality of rotors, wherein the first plurality of adjustment normalization values normalize different types of adjustments having different units;
data storage media containing a second plurality of adjustment normalization values for a plurality of possible adjustments of blades of a second one of the plurality of rotors, wherein the second plurality of adjustment normalization values normalize different types of adjustments having different units and wherein, for a particular adjustment type, an adjustment normalization value of the first plurality of adjustment normalization values is independent of a corresponding adjustment normalization value of the second plurality of adjustment normalization values for the particular adjustment type;
data storage media containing coefficient of vibration data that corresponds to effects on vibration caused by adjustments to the blades;
wherein the computer software includes:
executable code that receives a plurality of vibration values corresponding to vibrations caused by the blades;
executable code that applies the coefficient of vibration data and the first and second plurality of adjustment normalization values to the vibration values to provide a set of total normalized vibration values corresponding to sets of possible adjustments to be applied to the blades; and
executable code that selects a set of adjustments to be applied to the blades, the selected set of adjustments having a total normalized vibration value less than a predetermined value and corresponding to a lower amount of adjustment than other sets of adjustments having a total normalized vibration value less than the predetermined value.

12. The computer-readable medium, according to claim 11, wherein the predetermined value corresponds to an expected value of all errors.

13. The computer-readable medium, according to claim 11, further comprising:
executable code that performs an FFT on the vibration data, wherein the data indicating effects on vibration is provided in the frequency domain and wherein applying the coefficient of vibration data and the first and second plurality of adjustment normalization values to the vibration values is performed in the frequency domain.

14. The computer-readable medium, according to claim 13, wherein the vibration values, the coefficient of vibration data, the first plurality of adjustment normalization values, the second plurality of adjustment normalization values, and the adjustments are all matrixes and wherein the vibration values include a first matrix, u, corresponding to measured vibrations and a second matrix, v, corresponding to desired vibrations.

15. The computer-readable medium, according to claim 14, wherein executable code that selects a set of adjustments solves for possible values for the adjustments using the equation:

$$v = u + X \cdot a$$

where a represents the adjustment and X represents the coefficient of vibration data.

16. The computer-readable medium, according to claim 15, wherein solving for possible values of the adjustments includes replacing X with $Q \cdot R$, where $Q^T \cdot Q$ equals the identity matrix, I, and R is an upper triangular matrix and wherein solving for possible values of the adjustments includes evaluating $|Q^T \cdot u + R \cdot a|$.

17. The computer-readable medium, according to claim 16, wherein a is determined using a numeric technique to find a local minimum for $a^T \cdot (WF \cdot E) \cdot a$ subject to a constraint that $|Q^T \cdot u + R \cdot a|$ is less than the predetermined value, wherein E is a diagonal matrix having elements corresponding to a predetermined scaling amount for each type of adjustment and wherein WF is a weight factor matrix.

18. The computer-readable medium, according to claim 17, further comprising:
executable code that determines said local minima using a Newton-Raphson technique.

19. A system that determines adjustments to decrease vibrations caused by rotating blades from a plurality of rotors, comprising:
- a plurality of accelerometers that provide a plurality of vibration values corresponding to vibrations caused by the blades; and
- a main processing unit, coupled to the accelerometers, having a memory with a first plurality of adjustment normalization values for a plurality of possible adjustments of blades of a first one of the plurality of rotors, wherein the first plurality of adjustment normalization values normalizes different types of adjustments having different units, the memory also having a second plurality of adjustment normalization values for a plurality of possible adjustments of blades of a second one of the plurality of rotors, wherein the second plurality of adjustment normalization values normalizes different types of adjustments having different units and wherein, for a particular adjustment type, an adjustment normalization value of the first plurality of adjustment normalization values is independent of a corresponding adjustment normalization value of the second plurality of adjustment normalization values for the particular adjustment type, the memory also having coefficient of vibration data that corresponds to effects on vibration caused by adjustments to the blades, the main processing unit also having executable code that applies the coefficient of vibration data and the first and second plurality of adjustment normalization values to the vibration values to provide a set of total normalized vibration values corresponding to sets of possible adjustments to be applied to the blades and executable code that selects a set of adjustments having a total normalized vibration value less than a predetermined value and corresponding to a lower total amount of adjustment than other sets of adjustments having a total normalized vibration value less than the predetermined value.

20. A system, according to claim 19, wherein the main processing unit includes an output that provides data to at least one of: a storage card and a display.

* * * * *

UNITED STATES PATENT AND TRADEMARK OFFICE
CERTIFICATE OF CORRECTION

| | | |
|---|---|---|
| PATENT NO. | : 7,512,463 B1 | |
| APPLICATION NO. | : 11/058812 | |
| DATED | : March 31, 2009 | |
| INVENTOR(S) | : Eric Robert Bechhoefer | |

It is certified that error appears in the above-identified patent and that said Letters Patent is hereby corrected as shown below:

Column 17, line 30, "$IQ^{T}u+R \cdot al$" should read --$IQ^{T} \cdot u+R \cdot al$--.

Signed and Sealed this
Twenty-eighth Day of December, 2010

David J. Kappos
*Director of the United States Patent and Trademark Office*